I. V. MOODY.
MOTOR.
APPLICATION FILED APR. 3, 1909.
947,594.
Patented Jan. 25, 1910.
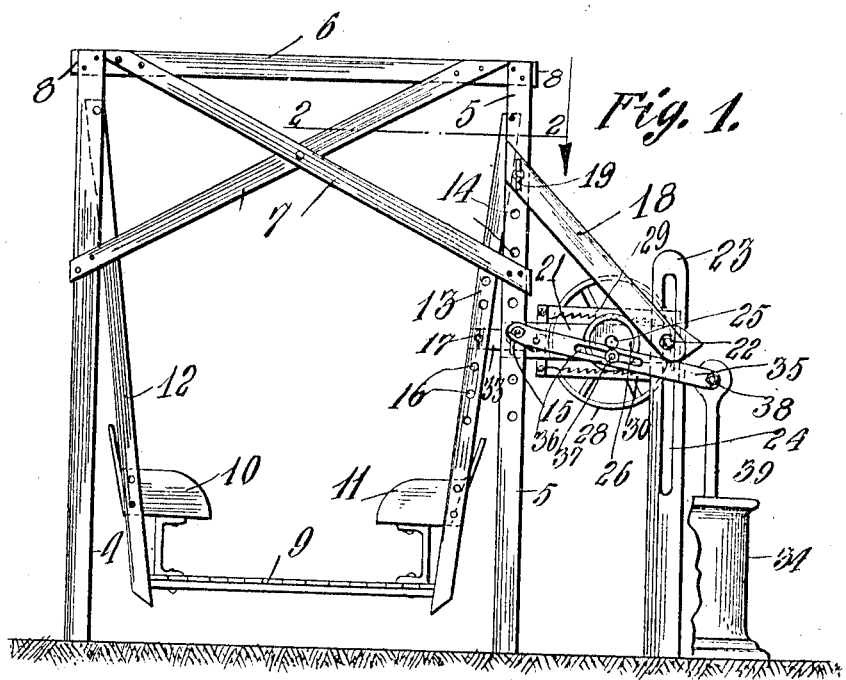
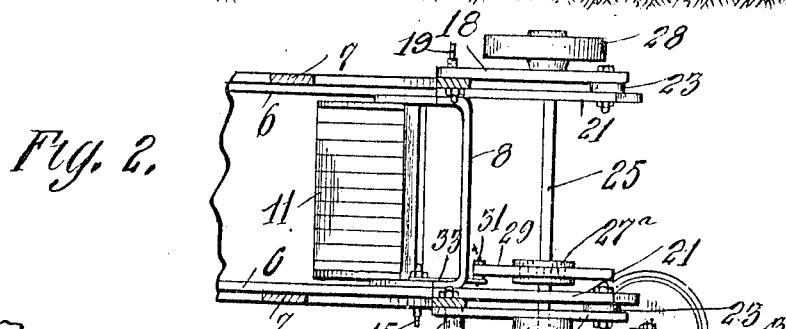
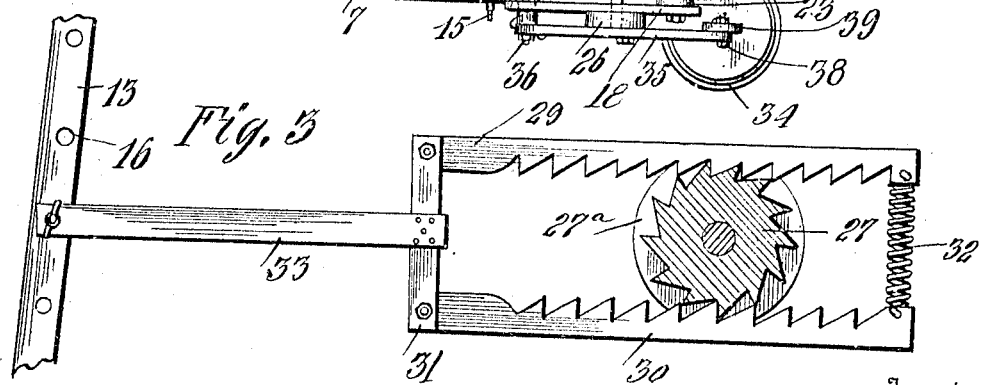
Witnesses
Morris Lessin.
E. M. Ricketts.
Inventor
Ira V. Moody
By Watson E. Coleman
Attorney

UNITED STATES PATENT OFFICE.

IRA V. MOODY, OF ELWOOD, INDIANA.

MOTOR.

947,594.   Specification of Letters Patent.   Patented Jan. 25, 1910.

Application filed April 3, 1909. Serial No. 487,746.

*To all whom it may concern:*

Be it known that I, IRA V. MOODY, a citizen of the United States, residing at Elwood, in the county of Madison and State of Indiana, have invented certain new and useful Improvements in Motors, of which the following is a specification, reference being had to the accompanying drawings.

My invention relates to means whereby the motion of swinging in ordinary lawn swings, or other apparatus, may be utilized, and the power usually wasted in the operation of such apparatus used for driving light machinery such as pumps, washing machines, churns, grindstones, wheat fans, cutting boxes, or the like.

The object of the invention is to provide an attachment which may be readily connected with, or disconnected from an ordinary lawn swing by means of which its motion may be transmitted to light machinery, which attachment shall be cheap to construct and not liable to damage or breakage, and which may be readily moved from place to place as it may be required for use.

With this object in view the invention consists in the improved construction, arrangement and combination of the parts of an attachment of this character which will be hereinafter fully described and afterward specifically pointed out in the appended claims.

While my improved attachment may be utilized to run any kind of light machinery within the limit of the power exerted in the operation of the swing, I have illustrated it in the accompanying drawing as applied to a pump, and in said drawing—

Figure 1 is a view in side elevation of a swing with the attachment and pump connected thereto ready for operation. Fig. 2 is a sectional plan view of the attachment and part of the swing, taken on the line 2—2 of Fig. 1, looking downward as indicated by the arrow, and Fig. 3 is a detail view, on an enlarged scale of the operating ratchet wheel and double rack.

Like reference characters mark the same parts in all of the figures.

Referring specifically to the drawings, 4 and 5 indicate the uprights or bars which form the supports of the frame of the swing, which frame is of ordinary construction being provided with suitable horizontal bars 6 and braces 7 and 8, the floor 9 and seats 10 and 11 being supported from the frame by swinging bars 12 and 13 in the usual manner. In preparing this ordinarily constructed swing, which can readily be bought ready made, for the reception of my attachment, the only preparation necessary before the attachment is applied will be to make a series of holes, as at 14, 14, in the uprights 5 to receive bolts 15, and holes 16, 16, in the swinging bars to receive the bolts 17, said bolts serving to removably secure the attachment to the swing, the attachment being further steadied and supported by braces 18 secured to the uprights 5 by bolts 19. All of these bolts 15, 17 and 19 are secured by suitable removable nuts 20, shown in this instance as wing nuts for ready removal by hand, but ordinary nuts may be used, requiring a wrench for removal, if desired.

The main side bars of the frame of the attachment are indicated at 21 which are removably secured by the bolts 15 to the uprights 5 and further connected to said uprights by the braces 20 which are removably secured to the ends of the side bars by bolts 22. The object of the series of holes 14 and 16 is to provide for the securing of the attachment at higher or lower points on the uprights in order to accommodate the apparatus to machines of different heights.

If desired, legs 23, provided with slots 24, whereby they may be adjustably secured by bolts 22, may be used to support the outer ends of the side bars 21 at their several adjustments, the slots permitting of any degree of adjustment to compensate for unevenness in the ground or floor upon which the attachment rests.

In the side bars 21 is journaled a shaft 25 upon which is secured a crank wheel 26, a ratchet wheel 27 and a fly or balance wheel 28, in the present instance the crank wheel and fly wheel being mounted outside of the side bars, and the ratchet wheel between the side bars, although this relation may be varied to suit circumstances in applying it to the running of different machines, the crank wheel being sometimes, as well as the fly wheel, adapted to serve as belt or sprocket wheels to receive ordinary belts, or sprocket chains.

The ratchet wheel 27 is inclosed between two ratchet toothed racks 29 and 30, the rack above the wheel having its teeth pointing in the reverse direction from those of the rack below the wheel so that one will operatively engage the teeth when moved in one direction and the other when moved in the opposite direction, thus insuring the continuous rotation of the ratchet wheel, and with it the shaft 25, crank wheel 26 and fly wheel 28, in one direction, when the racks are reciprocated.

The racks 29 and 30 are pivotally connected at their inner ends to a T-head or bar 31 and are yieldingly drawn toward each other, and into engagement with the teeth of the ratchet wheel 29 by means of a spring 32 which connects their outer ends.

The T head or bar 31 is rigidly secured to the outer end of a rod 33 which is connected at its inner end to the swinging bar 13 of the swing, by the bolt 17 engaging in the holes 16 and removably secured as before stated, as by one of the wing nuts 20.

As thus far described, my attachment is ready for operation for the running of any kind of light machinery which requires the rotation of a shaft, but to adapt it to the operation of a pump, as at 34, I pivot a slotted rod 35 at 36 to the upright 5, adjust the slot 36 therein over the crank pin 37 on the crank wheel 26 and pivotally connect its outer end at 38 to an upright rod 39, which in this instance is the rod of the pump 34, but which may just as well be the handle of a churn dasher or a vertically reciprocating part of any kind of a light, easy running machine.

As the swing is operated by a person or persons sitting on the seats 10 and 11, the racks are reciprocated, and the shaft 25 revolved, thus operating the pump or other machine, in a manner needing no further description, the power exerted for the pleasure or amusement of the occupants of the swing being utilized to perform many of the useful and necessary operations of the house, shop, or farm.

The attachment may be utilized to store up power when not needed, by attaching to it a spring or gravity motor, which may be wound up by the motion of the swing so as to always be ready for use.

Having thus described my invention, what I claim is:

1. A lawn swing comprising rigid uprights and swinging bars supporting seats, in combination with a frame secured to the uprights, a shaft journaled in the frame, a ratchet gear on the shaft, a rod pivotally secured to a swinging bar, two ratchet racks pivotally connected to said rod and inclosing the ratchet gear, and means for yieldingly maintaining the racks in contact with the ratchet gear.

2. A lawn swing comprising rigid uprights and swinging bars supporting seats, in combination with a frame secured to the uprights, a shaft journaled in the frame, a ratchet gear on the shaft, a rod pivotally secured to a swinging bar, two ratchet racks pivotally connected to said rod and inclosing the ratchet gear, and means for yieldingly maintaining the racks in contact with the ratchet gear, the upper rack having teeth in its lower edge engaging the teeth at the top of the gear and the lower rack having teeth in its upper edge engaging the teeth at the bottom of the gear, the teeth of the two racks pointing in opposite directions.

3. A lawn swing comprising rigid uprights and swinging bars supporting seats, in combination with a frame secured to the uprights, a shaft journaled in the frame, a ratchet gear on the shaft, a rod pivotally secured to a swinging bar, two ratchet racks pivotally connected to said rod and inclosing the ratchet gear, a crank wheel on the shaft having a pin, and a lever pivotally attached to the upright of the swing and having a longitudinal slot engaging the crank pin.

4. A lawn swing comprising rigid uprights having a series of holes, and swinging, seat-supporting bars also provided with a series of holes, horizontal side bars, bolts engaging in the holes in the uprights for adjustably and removably securing the side bars thereto, braces, bolts for pivotally and removably securing them at one end to the horizontal bars and at the other end to the uprights, a shaft journaled in the horizontal bars, a ratchet gear on the shaft, racks embracing the ratchet gear, bolts for pivotally and adjustably securing them to the swinging bars, and means for transmitting the rotation of the shaft to light machinery.

5. A lawn swing comprising rigid uprights having a series of holes, and swinging, seat-supporting bars also provided with a series of holes, horizontal side bars, bolts engaging in the holes in the uprights for adjustably and removably securing the side bars thereto, braces, bolts for pivotally and removably securing them at one end to the horizontal bars and at the other end to the uprights, a shaft journaled in the horizontal bars, a ratchet gear on the shaft, a rod, bolts for pivotally and adjustably connecting it to the swinging bars of the swing, a T head on the end of said rod, racks pivotally secured to the opposite ends of said T head, one of said racks resting on top of the ratchet gear and the other engaging the bottom thereof, the racks having oppositely pointed teeth, means for yieldingly holding the racks in engagement with the gear, a crank on the end of the shaft, and a lever pivotally secured at one end to the upright of the swing frame, said lever having a longitudinal slot engaging the crank pin.

In testimony whereof I hereunto affix my signature in the presence of two witnesses.

IRA V. MOODY.

Witnesses:
DAVID F. DECK,
OMER F. BOGUE.